United States Patent [19]
Takizawa et al.

[11] Patent Number: 5,512,234
[45] Date of Patent: Apr. 30, 1996

[54] METHOD AND APPARATUS FOR MANUFACTURING SURFACE FASTENER

[75] Inventors: Toshiaki Takizawa; Ryuichi Murasaki, both of Toyama, Japan

[73] Assignee: YKK Corporation, Tokyo, Japan

[21] Appl. No.: 343,856

[22] Filed: Nov. 17, 1994

[30] Foreign Application Priority Data

Dec. 28, 1993 [JP] Japan ................... 5-337497

[51] Int. Cl.⁶ ................... B29C 41/30; B29C 39/18
[52] U.S. Cl. ................... 264/511; 156/66; 156/244.18; 264/556; 264/571; 264/145; 264/167; 264/171.13; 264/171.23; 425/115; 425/327; 425/388
[58] Field of Search ................... 264/167, 145, 264/166, 243, 171, 175, 171.13, 171.23, 511, 571, 555, 556; 156/66, 178, 244.11, 244.18; 425/381, 388, 382.3, 115, 327

[56] References Cited

U.S. PATENT DOCUMENTS

| | | | |
|---|---|---|---|
| 3,089,191 | 5/1963 | Conrad | 425/327 |
| 3,399,425 | 9/1968 | Lemelson | 425/327 |
| 3,551,544 | 12/1970 | Hlinka | 264/175 |
| 3,574,019 | 4/1971 | Girard | 156/66 |
| 3,594,863 | 7/1971 | Erb | 425/327 |
| 3,758,657 | 9/1973 | Menzin et al. | 264/167 |
| 4,461,738 | 7/1984 | Russell | 264/167 |
| 4,794,028 | 12/1988 | Fischer | 264/167 |
| 4,861,399 | 8/1989 | Rajala et al. | 156/66 |
| 4,999,067 | 3/1991 | Erb et al. | 156/66 |
| 5,260,015 | 11/1993 | Kennedy et al. | 264/243 |
| 5,393,475 | 2/1995 | Murasaki et al. | 264/167 |

*Primary Examiner*—Jeffery R. Thurlow
*Attorney, Agent, or Firm*—Hill, Steadman & Simpson

[57] ABSTRACT

Molten resin is extruded in a predetermined width from an extrusion nozzle. The molten resin is forced to a die wheel, which is situated facing the extrusion nozzle with a predetermined gap therewith, has inside a cooling unit and is adapted to be rotated in one direction. On the surface of the die wheel, a flat-plate-like substrate member and engaging members are integrally molded of the molten resin. Simultaneously, as a continuous filament is supplied, loop members are successively formed. Then the loop members are pressed against the substrate member in upright posture and are successively fused therewith.

14 Claims, 3 Drawing Sheets

METHOD AND APPARATUS FOR MANUFACTURING SURFACE FASTENER

BACKGROUND OF THE INVENTION

1. Field of the Invention

This invention relates to a method of and an apparatus for manufacturing a surface fastener by continuously molding a plate-like substrate member by extrusion using thermoplastic resin and for molding loop members from a fiber filament on the substrate member simultaneously with the molding of the plate-like substrate member.

2. Description of the Related Art

A surface fastener having hook members on opposite surfaces of a substrate member is disclosed in, for example, Japanese Patent Publication No. SHO 42-8749. In manufacturing the double-sided surface fastener disclosed in Japanese Patent Publication No. SHO 42-8749, loop members are formed by a multifilament and a monofilament woven on front and back surfaces, respectively, of a woven cloth, and then both filaments are heat-set, whereupon part of each of the monofilament loop members is cut to have a hook shape. The resulting surface fastener has a hook surface and a loop surface on the respective sides. Then the loop and hook members are fixed to the foundation woven fabric by applying resin to the fabric.

Although there is no specific disclosure about the manufacturing method and apparatus, a surface fastener having a mixture of hook members and loopsmembers existing on one surface of a substrate member is proposed by, for example, Japanese Utility Model Laid-Open Publication No. HEI 4-6908. This surface fastener also is made of fibers, and presumably its manufacturing method is the same as that disclosed in the above-mentioned publication.

In the meantime, Japanese Patent Laid-Open Publication No. HEI 1-238805 discloses a surface fastener manufactured by molding a substrate member and engaging members from synthetic resin. More particularly, FIG. 18 of the Publication shows a double-sided surface fastener in which a multiplicity of rows of mushroom-shape engaging members of the same synthetic resin material project from one surface of the substrate member and a multiplicity of rows of spherical-headed engaging members of the same synthetic resin material project from the other surface of the substrate member. According to the manufacturing principle of the double-sided surface fastener disclosed in the Publication, as is apparent from the description of the specification, a predetermined width of surface fastener having a multiplicity of engaging member rows is manufactured by joining a large number of small-width tape substrates edge to edge with an adhesive agent or an adhesive resin, with or without using a common connecting sheet on the back side.

Therefore, in manufacturing the surface fastener disclosed in Japanese Patent Laid-Open Publication No. HEI 1-238805, firstly a small-width tape having a longitudinal row of engaging members is molded continuously or discontinuously by injection or press, and then a necessary number of tapes are arranged laterally and the tape substrates are joined edge to edge with an adhesive agent or the like.

Further, the technology of extruding a substrate member using thermoplastic resin and, at the same time, molding hook members on one surface of the substrate member is already known by, for example, U.S. Pat. No. 3,312,583 and International Patent Application Japanese Publication No. HEI 1-501775. The molding method disclosed in U.S. Pat. No. 3,312,583 comprises extruding molten thermoplastic resin onto a circumferential surface of a drum-shape die wheel, in which a multiplicity of mold discs and a multiplicity of spacer plates are laminated alternately, forcing the resin into hook-member-forming cavities of the mold discs, then pressing the resin on the drum surface to form a substrate member, and pulling molded hook members out of the cavities along with the substrate member in timed relation to the rotation of the drum while the resin is cooled. The mold disc has in one side surface hook-shape cavities extending radially from the circumferential surface toward the center and space circumferentially at predetermined distances. The side surfaces of the spacer plate are flat. The reason why the spacer plate is needed is that the hook-shape cavities cannot be formed in a single mold.

However, the woven-cloth-type surface fastener disclosed in Japanese Patent Publication No. SHO 42-8749 has a characteristic feature in that as the flexibility of the woven cloth is combined with the flexibility of the monofilament, a very smooth touch can be achieved when books of the surface fastener are coupled with and uncoupled from the loop members of the companion surface fastener. Since the monofilament constituting the hook members is drawn, it is excellent in pulling strength and bending strength though small in cross-sectional area. Further, since the woven structure has a very high density of hook members, it is possible to obtain a high coupling rate and an adequate degree of durability for repeated use. However, since this woven-cloth-type surface fastener requires a large consumption of material and a large number of manufacturing steps, it is difficult to reduce the cost of production.

In manufacturing the double-sided surface fastener having engaging members of fibers on both the front and back surfaces of the woven foundation, unlike the ordinary woven-cloth-type surface fastener having engaging members on only one side, it is impossible to impregnate the resin into only the foundation avoiding the engaging members simply by applying resin to the foundation in order to fix the roots of the engaging members projecting from the front and back surfaces of the foundation as described in the above-mentioned Publication. Consequently it is very difficult to adequately fix the engaging members to the foundation without causing the engaging members to become rigid.

In the surface fastener disclosed in Japanese Utility Model Laid-Open Publication No. HEI 4-6908, if manufactured efficiently, it has the foregoing advantage because of its fibers. However, since a mixture of monofilament loops and multifilament loops exist on one surface of the substrate cloth, forming hook members by cutting only the nomofilament loops would require a very complex manufacturing process and an apparatus having a complicated mechanism, thus causing a poor rate of production and increasing the manufacturing cost.

Accordingly, it is understood that in the conventional surface fastener having engaging members and loop members it is difficult to guarantee high quality.

Further, manufacturing the molded surface fastener disclosed in Japanese Patent Laid-Open Publication No. HEI 1-238805 would require a very complex manufacturing process, as is apparent from the description in the Publication, and hence it is inefficient and poor in productivity so that mass production of double-sided surface fasteners having the structure shown in FIG. 18 of the Publication is virtually impossible due to the manufacturing principle.

According to the surface fastener manufacturing method disclosed in, for example, International Patent Application Japanese Publication No. HEI 1-501775, since the hook members formed on the substrate member are merely molded of resin without being drawn, they are rigid and markedly poor in engaging strength as compared to those of fibers having the same size.

SUMMARY OF THE INVENTION

It is therefore an object of this invention to provide a method of and an apparatus for manufacturing a high-quality surface fastener, securing a high rate of production of the surface fastener of the type having hook members and loop members on the front surface of a flat-plate-like substrate member.

As the result of various studies made in order to accomplish the above object, the present inventors have reached the conclusion that it is most preferable to utilize extrusion molding technology to improve the manufacturing efficiency. The inventors have presumed that the above-mentioned demands can be satisfied by developing the known synthetic resin surface fastener molding technology according to, for example, U.S. Pat. No. 3,312,583 and International Patent Application Japanese Publication No. HEI 1-501775.

According to a first aspect of the invention, there is provided a method of continuously manufacturing a surface fastener, comprising the following steps. Firstly, molten resin is extruded by a predetermined width from an extrusion nozzle. And the extruded molten resin is extruded against a one-way-rotating die wheel which has in it cooling means and is situated in a confronting relationship with the extrusion nozzle with a predetermined gap for molding a flat-plate substrate sheet. Then the flat-plate substrate sheet is continuously molded by rotating the die wheel in a direction of extrusion of the molten resin, and successive loop members are continuously attached in the form of a continuous filament to the substrate sheet by pressing the loop members in an upright posture against the substrate sheet.

Preferably, the die wheel has in its surface hook-member-forming cavities, and hook members are molded on the substrate sheet by charging the molten resin in the cavities continuously with the extruding of the molten resin. Further, all of the continuous filaments may be multifilaments or all or a part of the continuous filaments may be monofilaments, and in a subsequent step, part of the loop members of the monofilaments are cut to form hooks.

As is apparent from this method, according to the molded double-sided surface fastener manufacturing method of this invention, it is possible to continuously manufacture a desired surface fastener easily in which male and/or female engaging members are formed on the substrate member in a series of single steps. More particularly, it is possible to manufacture the molded surface fastener, which is excellent in engaging strength and touch, with high quality and at a high rate of production, reducing the manufacturing cost.

According to a second aspect of the invention, there is provided an apparatus for continuously manufacturing a surface fastener, comprising a die wheel having in it means for cooling and adapted to be driven for one way rotation, an extrusion nozzle situated in a confronting relationship with the die wheel with a gap for molding a flat-plate substrate sheet therebetween and having a predetermined extrusion passageway for molten resin, and a loop-member-forming wheel adapted to be situated adjacent to a surface of molten resin molded members, which is extruded from the extrusion nozzle and is molded by the die wheel, for forming a straight filament into successive loops.

Preferably, the die wheel has in its circumferential surface hook-member-forming cavities. Further, the loop-member-forming wheel includes a rotary drum having in its circumferential surface a loop-forming portion, and a fixed drum supporting the rotary drum from inside. The fixed drum has a suction portion communicating with the loop-forming portion of the rotary drum.

In manufacturing the surface fastener using this apparatus, molten resin to be extruded from the extrusion nozzle is forced into a gap between the extrusion nozzle and the die wheel, and part of the molten resin is charged progressively into the hook-member-forming cavities to mold the hook members and to continuously mold a flat-plate-like substrate member having a predetermined thickness and a predetermined width.

The thus molded substrate member and hook members are guided around the circumferential surface of the die wheel, during which they are cooled from the interior of the die wheel to progressively become hard. During this hardening, if the substrate member is pulled by a suitable force in the direction of extrusion, the individual hook members are removed smoothly from the cavities as they elastomerically deform into a straight form. Immediately after that, each hook member restores its original shape and the resulting hook member is gradually cooled to become hard. Then the substrate with hook members removed from the die wheel is introduced between the loop-forming wheel and a pressure roller.

During this molding, a plurality of loop-forming filaments are simultaneously supplied virtually tensionlessly to filament guide grooves on the circumferential surface of the loop-forming wheel as guided by filament guides. At that time, it is preferble to heat the filaments previously by a heater. When the supplied filaments are introduced into the filament guide grooves, they are gradually bent into a U shape along the inner surface of the loop-forming portion by a strong suction force from a suction portion, with predetermined longitudinal distances. Then the filaments keeping the U shape are forwarded to the substrate member between the hook member rows in response to the rotation of the rotary drum and are taken up toward discharge rollers as filament portions exposed on the circumferential surface of the wheel are pressed against the substrate member between the hook member rows.

When part of each filament is thus pressed against the surface of the substrate member, the filaments are embedded in the surface of the substrate member integrally therewith if the substrate member is in a semi-molten state. As a result, the surface fastener having a mixture of a multiplicity of loop members and a multiplicity of hook members is manufactured. For fixing the filaments to the substrate member, it is desirable to heat the filaments previously; at that time, the substrate member also may be reheated immediately short of the loop-forming wheel. If it is difficult to fuse the filaments integrally with the semi-molten substrate member, an adhesive agent may be applied to the filament portions exposed on the circumferential surface of the loop-forming wheel.

DETAILED DESCRIPTION

Embodiment of this invention will now be described in detail with reference to the accompanying drawings.

Figure 1:
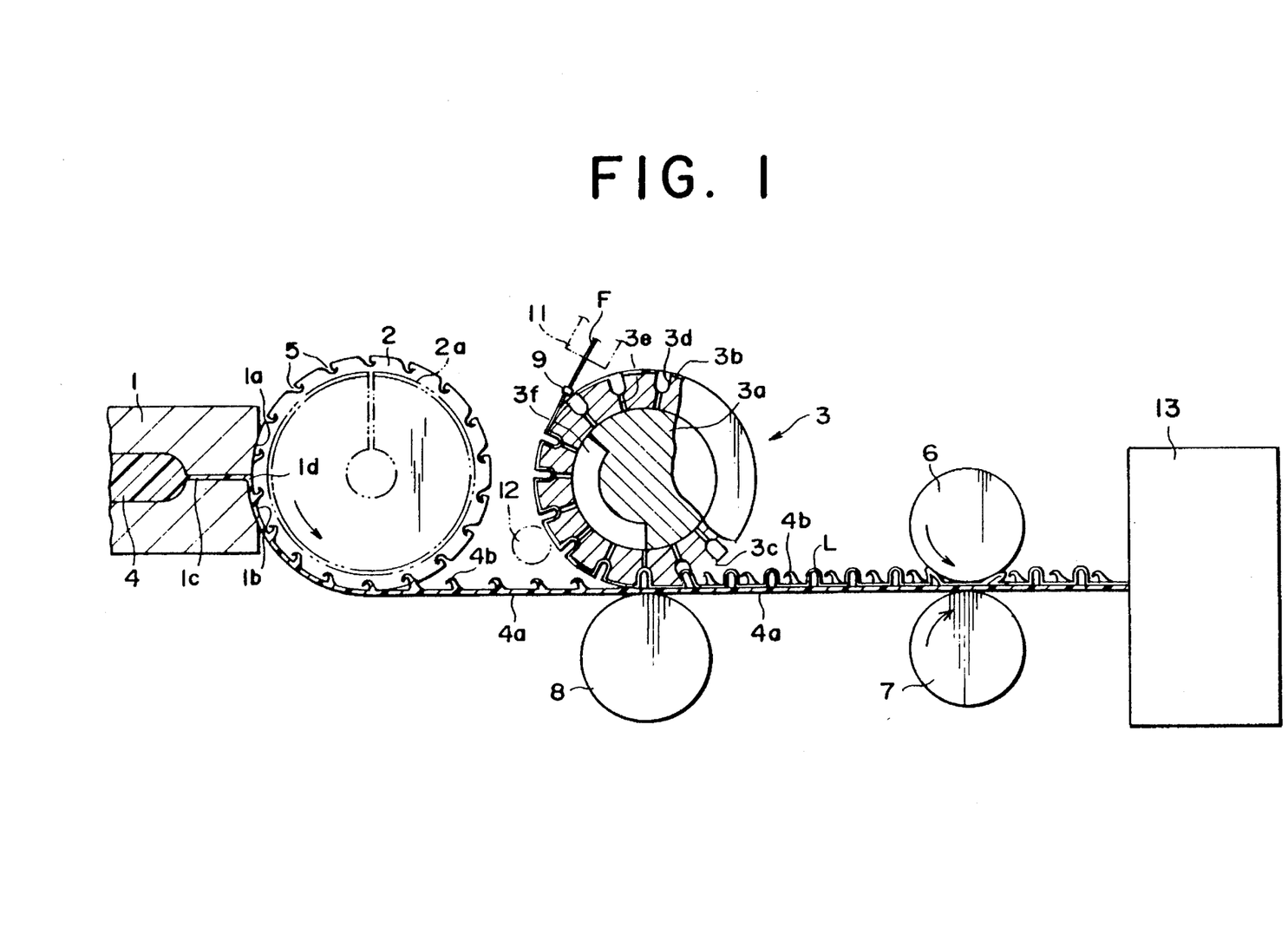
FIG. 1 is a fragmentary vertical cross-sectional view of a surface fastener manufacturing apparatus, in which a multiplicity of hook and loop members are simultaneously formed on one surface of a substrate member, according to a first embodiment of this invention.

FIG. 1 is a fragmentary vertical cross-sectional view of an apparatus for manufacturing a surface fastener, in which a multiplicity of hook and loop members are simultaneously formed on one surface of a substrate member, according to a first embodiment of this invention.

In FIG. 1, reference numeral 1 designates an extrusion nozzle. The upper half of an end surface of the nozzle 1 is an arcuate surface 1a having a curvature virtually equal to that of a die wheel 2 described below, while the lower half end surface is an arcuate surface 1b having a predetermined gap between the arcuate surface 1b and a curved surface of the die wheel 2 for molding a substrate sheet. The extrusion nozzle 1 is a T-type die, from an outlet of which molten resin 4 is to be extruded in the form of a sheet. According to this embodiment, the extrusion nozzle 1 has a centrally extending molten resin flow passageway 1c.

Since the structure of the die wheel 2 is substantially identical with the structure disclosed in International Patent Application Japanese Publication No. HEI 1-501775, it is described here briefly. The die wheel 2 is in the form of a hollow drum having in it a water cooling jacket 2a. Centrally in the hollow drum, a multiplicity of ring-shape plates laminated along the axis of the hollow drum. Each of every other ring-shape plates has in the front and back surfaces a multiplicity of hook-member-forming cavities 5 with the base of each hook member opening to the circumferential surface of the drum. Both the front and back surfaces of each of non-illustrated ring-shape plates adjacent to the ring-shape plate having the hook-member-forming cavities 5 are flat. The die wheel 2 is rotatable, in a direction indicated by an arrow, as driven by a non-illustrated known drive unit. Downstream of the die wheel 2, a set of upper and lower discharge rollers 6, 7 is situated.

Between the die wheel 2 and the discharge rollers 6, 7, there are a loop-forming wheel 3 having a lower surface in flush with the lower surface of the die wheel 2, and a pressure roller 8 for pressing the loop-forming wheel 3 from the lower side. The loop-forming wheel 3 has a fixed drum 3a located centrally in the wheel 3 and fixedly supported by a non-illustrated frame, and a rotary drum 3b rotatably mounted on the circumferential surface of the fixed drum 3a.

The rotary drum 3b has on its circumferential surface a plurality of very shallow filament guide grooves 3c parallel to one another in the circumferential direction. The filament guide grooves 3c are generally U-shape loop-forming sections 3d spaced at predetermined distances in the circumferential direction and extending toward the axis of the wheel 3. Each loop-forming section 3d has in its bottom surface a suction hole 3e extending to the inner circumferential surface of the rotary drum 3b. A plurality of loop-forming filaments F of monofilament or multifilament are parallel supplied to the yarn guide grooves 3c via yarn guides 9, respectively. The filament guide grooves 3c are located between the circumferential rows of hook-member forming cavities 5 of the die wheel 2. Further, it is preferable that the rotary drum 3b has in its circumferential surface non-illustrated grooves for receiving the hook member rows so that the hook members 4b are prevented from being compressed between the loop-forming wheel 3 and the pressure roller 8 and hence the hook shape is free from being damaged.

Further, the arcuate portion of the circumferential surface of the fixed drum 3a has a predetermined length of cutout to define a suction chamber 3f with the rotary drum 3b when the rotary drum 3b is mounted on the fixed drum 3a. The suction chamber 3f is located in confronting relationship with the die wheel 2, extending downwardly and terminates right above the pressure roller 8 and being connected to a non-illustrated suction source.

The resin material for the substrate and hook members and the filament material for the loop members are exemplified by thermoplastic resin such as nylon, polyester and polypropylene. The resin material and the filament material may be identical or may be different in which case suitable materials having mutual affinity are selected. During molding, the molten resin temperature, extrusion pressure, die wheel temperature, speed of rotation of the die wheel, etc. should of course be controlled in accordance with the material used.

According to the apparatus of this invention, molten resin 4 extruded from the extrusion nozzle 1 is forced into a gap between the extrusion nozzle 1 and the die wheel 2 in rotation, and part of the extruded molten resin 4 is gradually charged in the hook-member-forming cavities 5 to mold hook members 4b and to continuously mold a flat-plate-like substrate member 4a having a predetermined thickness and a predetermined width. The molded substrate and hook members 4a, 4b are moved around substantially a quarter of the circumferential surface of the die wheel 2, during which they are cooled from the interior of the die wheel 2 to gradually become hard. During this hardening, when the molded substrate member 4a is pulled in the direction of extrusion with a suitable force by the discharge rollers 6, 7, the individual hook members 4b are removed smoothly from the cavities 5 as they elastically deform into a straight form. Immediately after that, the look members 4b restore their original shape and hence are gradually cooled to become hard. Then the substrate and hook members 4a, 4b removed from the die wheel 2 are introduced into the gap between the loop-forming wheel 3 and the pressure roller 8.

During this molding, a plurality of loop-forming filaments F are simultaneously supplied virtually tensionlessly to filament guide grooves 3c on the circumferential surface of the rotary drum 3b as guided by filament guides 9. It is preferable to pre-heat the filaments F. When the supplied filaments F are introduced into the filament guide grooves 3c, they are gradually bent into U shape along the inner surface of the loop-forming section 3d by a strong suction force from a suction portion, with predetermined longitudinal distances. Then the filaments F keeping tile U shape are forwarded to the substrate member 4a between the hook member rows in response to the rotation of the rotary drum 3b and are taken up toward discharge rollers 6, 7 as filament portions exposed on the circumferential surface of tile wheel 3 and are pressed against the substrate member 4a *between the hook member rows.*

When part of the filaments is thus pressed against the surface of the substrate member 4a, the filaments F are embedded in the surface of the substrate member 4a integrally therewith if the substrate member 4a is in a semi-molten state. As a result, the surface fastener having a mixture of a multiplicity of loop members L and a multiplicity of hook members 4b is manufactured. For fixing the filaments F to the substrate member 4a, it is desirable to heat the filaments F previously; in such event, a heating unit 11 such as an infrared lamp is located immediately before the loop-forming wheel 3 as indicated by phantom lines in FIG. 1. If it is difficult to fuse the filaments F integrally with the semi-molten substrate member 4a, an adhesive agent applying roller 12 may be situated in contact with the circumferential surface of the loop-forming wheel 3 as indicated in phantom lines in FIG. 1 and hence an adhesive agent may be applied to the exposed filament portions.

In this embodiment, in order to remove the resin molded product (surface fastener with backing) from the die wheel 2, a set of upper and lower discharge rollers 6, 7 rotatable in opposite directions in synchronism with each other is used. Although the circumferential surfaces of the discharge rollers 6, 7 may be smooth, it is preferable that they have grooves for receiving the rows of hook members 4b so that the hook members 4b are kept from being damaged. The rotating speed of the discharge rollers 6, 7 is determined to be slightly larger than the rotating speed of the die wheel 2 so that the hook members 4b can be removed smoothly from the hook-member-forming cavities 5. A part or all of the loop members L may be cut to be hook members by a cutting apparatus 13 disposed downstream of the discharge rollers 6, 7. For the cutting apparatus, an apparatus disclosed in U.S. Pat. No. 2,933,797 may be used with modification.

Figure 2:
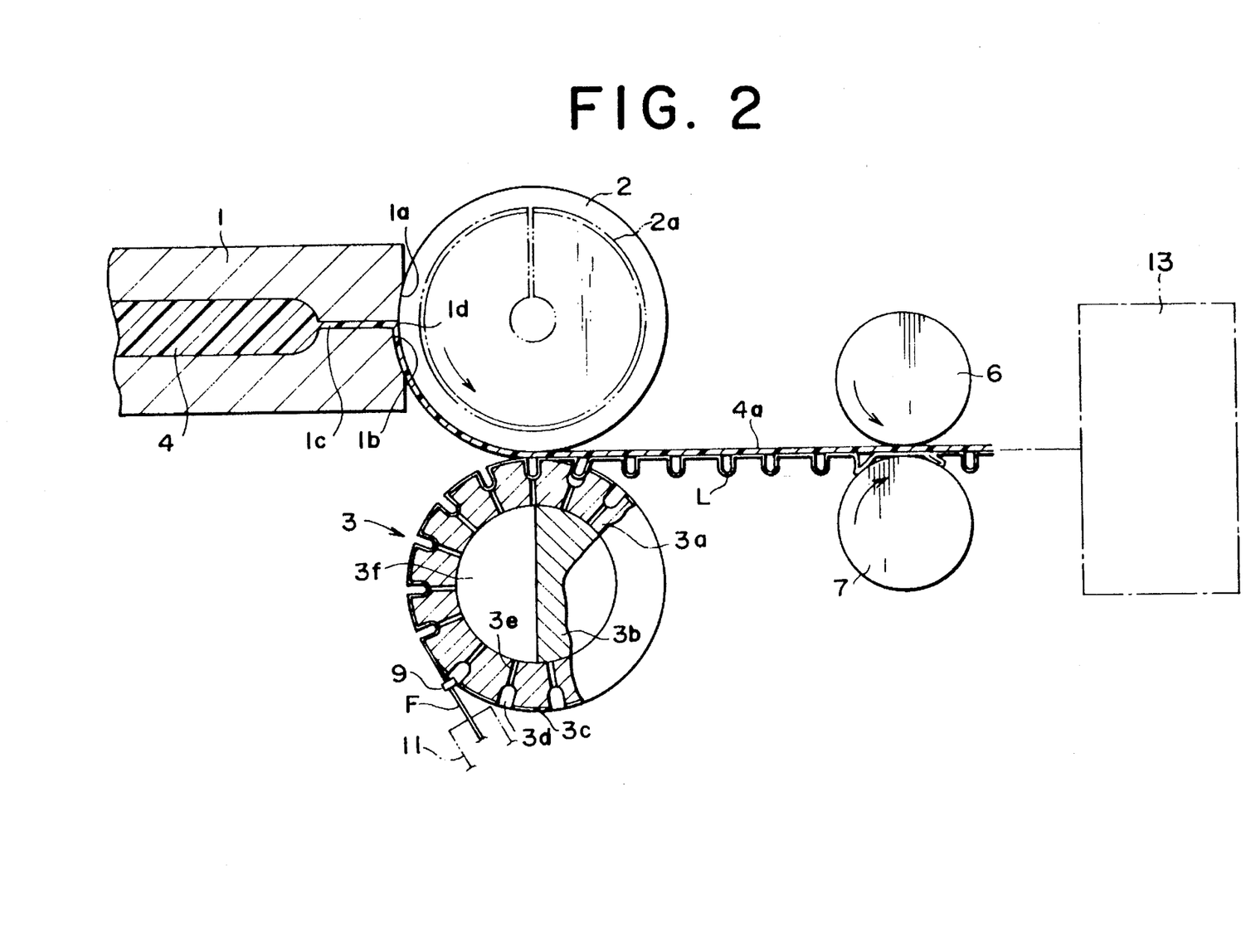
FIG. 2 is a fragmentary vertical cross-sectional view of an apparatus for manufacturing a surface fastener, in which loop members are formed on one surface of a substrate member, according to a second embodiment of the invention.

In the previously described embodiment, when multifilaments are used for the filaments F, the resulting surface fastener has on one surface of the substrate member 4a the molded hook members 4b and the multifilament loop members L, which constitute female engaging members of the surface fastener. FIG. 2 shows second embodiment in which hook members of fiber filaments F are formed on a substrate member 4a molded by extrusion. In this case, the die wheel 2 has a smooth circumferential surface devoid of hook-member-forming cavities. According to the second embodiment, the apparatus construction is substantially identical with that of the first embodiment except that every filament F to be supplied to the loop-forming wheel 3 is a monofilament. The surface fastener product manufactured in this second embodiment is a semi-product, and part or all of loop members L of monofilaments molded on the front surface of the substrate member 4a, which is molded of resin, is cut by a predetermined manner to form hook members, and as a result, a final surface fastener product having male engaging members can be manufactured. Further, in the apparatus of FIG. 2, if the filaments F combined of multifilaments and monofilaments are supplied to the loop-forming wheel 3, the loop members L of a mixture of multifilaments and monofilaments are formed on one surface of the substrate member 4a, and the loop member L of monofilaments are cut to form hook members, and as a result, a surface fastener having a mixture of male and female engaging members can be manufactured. Assuming that the circumferential surface of the die wheel 2 is smooth and that only multifilaments are used, it is possible to manufacture a surface fastener in which female engaging members of fiber filaments are formed on one surface of the substrate member 4a.

Therefore, according to the surface fastener manufacturing apparatus of this invention, since the surface fastener in which all engaging members are composed of fiber filaments can be manufactured, it is possible to make the adequate use of the advantageous characteristic of fiber filaments which can be drawn and enables free selection of denier. Thus it is possible to obtain a product which is very excellent in engaging strength and flexibility as compared to the ordinary surface fastener product.

Figure 3:
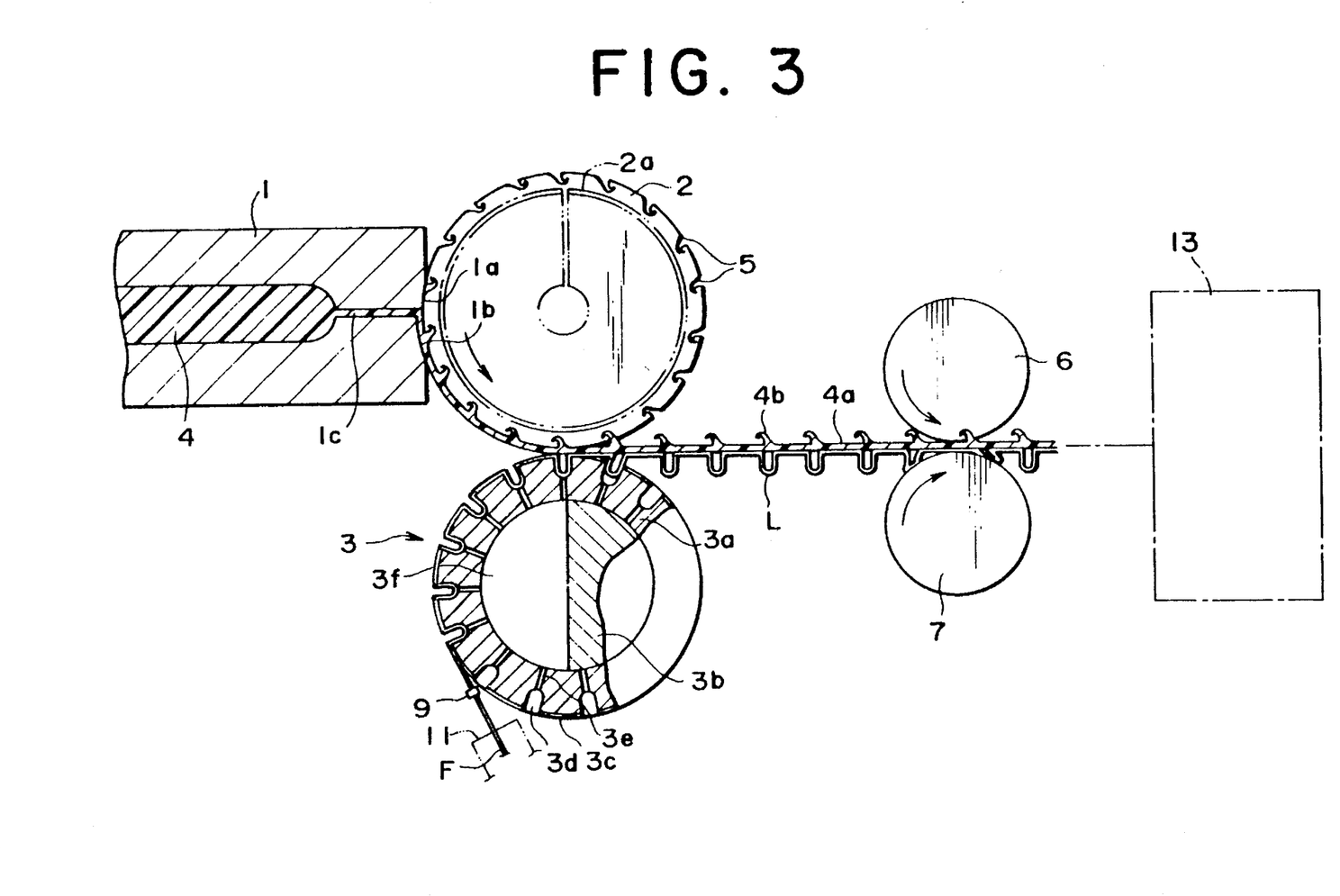
FIG. 3 is a fragmentary vertical cross-sectional view of an apparatus for manufacturing a surface fastener, which has hook members on one surface of a substrate member and loop members on the other surface of the substrate member, according to a third embodiment of the invention.

FIG. 3 shows a surface fastener manufacturing apparatus according to a third embodiment of this invention, in which hook members 4b are formed on one surface of an extrusion-molded substrate member 4a and, at the same time, loop members L of fiber filaments are formed on the other surface of the substrate sheet 4a integrally therewith. In the third embodiment, parts or elements substantially similar to those of the first embodiment are designated by like reference numerals.

For obtaining the above-mentioned surface fastener structure, the apparatus of the third embodiment is different from that of the first embodiment only in that the die wheel 2 and the loop-forming wheel 3 are vertically arranged so as to sandwich the molten resin, which is to be extruded from the extrusion nozzle 1, in a predetermined thickness, and as a result, the pressure roller 8 of the first embodiment is omitted. The surface fastener manufacturing mechanism is identical with the above-mentioned principle, so it description is omitted here. In this embodiment, when part of the filaments F is pressed against the substrate member 4a, the substrate member 4a does not yet become hard and remains in a semi-molten state so that the filaments F can be fused integrally with the substrate member 4a easily and hence finally can be firmly fixed to the substrate member 4a. Also in this embodiment, both multifilaments and monofilaments may of course be used for the filament material.

As mentioned above, in the surface fastener manufactured according to the foregoing embodiments shown in FIGS. 1 and 3, a multiplicity of hook members 4b are molded on the surface of the substrate member 4a. A multiplicity of rows of hook members 4b are formed on the surface of the substrate member 4a, and in the same hook row, the hook members 4b are directed in a common direction, and in the adjacent hook rows, the hook members 4b are directed in mutually opposite direction. Thus a surface fastener having no engaging direction is obtained. In the first and third embodiments, the engaging members to be molded on the surface of the substrate member are hook members However, the engaging members of this invention should by no means be limited to hook members and may be mushroom-shape, generally V-shape or other shaped anchor members.

As is explained above in detail, according to the method of this invention, various forms of surface fastener, in which hook and/or loop members of fiber filaments exist on the extrusion-molded substrate member, can be continuously manufactured efficiently in a single process without requiring meticulous processes, and the apparatus of this invention is simple in structure and excellent in operativity. Therefore this invention is particularly high in productivity in manufacturing this type of surface fastener.

Further, the surface fastener obtained according to this invention makes the adequate use of the characteristics of fiber material and hence is a high-quality product excellent in flexibility and engaging strength.

We claim:

1. A method of continuously manufacturing a surface fastener, comprising the steps of:

(a) extruding molten resin from an extrusion nozzle;

(b) extruding the extruded molten resin against a one-way-rotating die wheel which has in it cooling means and is situated in a confronting relationship with the extrusion nozzle with a gap for molding a flat-plate substrate sheet;

(c) continuously molding said flat-plate substrate sheet by rotating the die wheel in a direction of extrusion of the molten resin; and (d) continuously attaching a continuous filament to the substrate sheet while said filament is formed into successive loop members, by pressing the loop members in an upright posture against the substrate sheet.

2. A method of continuously manufacturing a surface fastener according to claim 1, wherein the die wheel has in its surface hook-member-forming cavities, and hook members are molded on the substrate sheet by charging the molten resin in the cavities continuously with said extruding of the molten resin.

3. A method of continuously manufacturing a surface fastener according to claim 2, wherein said loop members are formed on a surface of the substrate on which said hook members are molded.

4. A method of continuously manufacturing a surface fastener according to claim 2, wherein said loop members are formed on a surface of the substrate opposite to the surface on which said hook members are molded.

5. A method of continuously manufacturing a surface fastener according to claim 1, wherein the all of the continuous filaments are multifilaments.

6. A method of continuously manufacturing a surface fastener according to claim 1, wherein at least a part of the continuous filaments are monofilaments, and in a subsequent step, part of the loop members of the monofilaments are cut to form hooks.

7. A method of continuously manufacturing a surface fastener according to claim 6, wherein a part of the continuous filaments are monofilaments, said method further comprising the step of cutting a part or all of said loop members of monofilaments to form hooks.

8. A method of continuously manufacturing a surface fastener according to claim 6, wherein all of the continuous filaments are monofilaments, said method further comprising the step of cutting a part or all of said loop members to form hooks.

9. An apparatus for continuously manufacturing a surface fastener, comprising:

(a) a die wheel having in it means for cooling and adapted to be driven for one way rotation;

(b) an extrusion nozzle situated in a confronting relationship with said die wheel with a gap for molding a flat-plate substrate sheet therebetween and having an extrusion passageway for molten resin; and (c) a loop-member-forming wheel adapted to be situated adjacent to a surface of said substrate sheet for forming a straight filament into successive loops for attachment of said loops in an upright posture to said substrate sheet.

10. An apparatus for continuously manufacturing a surface fastener according to claim 9, wherein said die wheel has in its circumferential surface hook-member-forming cavities.

11. An apparatus for continuously manufacturing a surface fastener according to claim 9, wherein said loop-member-forming wheel includes a rotary drum having in its circumferential surface a loop-forming portion, and a fixed drum supporting said rotary drum from inside.

12. An apparatus for continuously manufacturing a surface fastener according to claim 9, wherein said fixed drum has a suction portion communicating with said loop-forming portion of said rotary drum.

13. An apparatus for continuously manufacturing a surface fastener according to claim 9, wherein said loop-member-forming wheel is disposed downstream of said die wheel with axes of both wheels being parallel.

14. An apparatus for continuously manufacturing a surface fastener according to claim 9, wherein said loop-member-forming wheel and said die wheel are arranged vertically with axes of both wheels being parallel.

* * * * *

UNITED STATES PATENT AND TRADEMARK OFFICE
CERTIFICATE OF CORRECTION

PATENT NO. : 5,512,234
DATED : April 30, 1996
INVENTOR(S) : Toshiaki Takizawa, et al It is certified that error appears in the above-identified patent and that said Letters Patent is hereby corrected as shown below:

The title page, showing the illustrative figure, should be deleted and substitute therefor with the attached title page.

The Drawing Sheet, consisting of Fig. 1, should be deleted to be replaced with ]the drawing sheet, consisting of Fig. 1, as shown on the attached page.

Signed and Sealed this

Twenty-fourth Day of September, 1996

Attest:

BRUCE LEHMAN

*Attesting Officer*     *Commissioner of Patents and Trademarks*

United States Patent [19]

Takizawa et al.

[11] Patent Number: 5,512,234
[45] Date of Patent: Apr. 30, 1996

[54] METHOD AND APPARATUS FOR MANUFACTURING SURFACE FASTENER

[75] Inventors: Toshiaki Takizawa; Ryuichi Murasaki, both of Toyama, Japan

[73] Assignee: YKK Corporation, Tokyo, Japan

[21] Appl. No.: 343,856

[22] Filed: Nov. 17, 1994

[30] Foreign Application Priority Data

Dec. 28, 1993 [JP] Japan .................. 5-337497

[51] Int. Cl.⁶ .................. B29C 41/30; B29C 39/18
[52] U.S. Cl. .................. 264/511; 156/66; 156/244.18; 264/556; 264/571; 264/145; 264/167; 264/171.13; 264/171.23; 425/115; 425/327; 425/388
[58] Field of Search .................. 264/167, 145, 264/166, 243, 171, 175, 171.13, 171.23, 511, 571, 555, 556; 156/66, 178, 244.11, 244.18; 425/381, 388, 382.3, 115, 327

[56] References Cited

U.S. PATENT DOCUMENTS

| | | | |
|---|---|---|---|
| 3,089,191 | 5/1963 | Conrad | 425/327 |
| 3,399,425 | 9/1968 | Lemelson | 425/327 |
| 3,551,544 | 12/1970 | Hlinka | 264/175 |
| 3,574,019 | 4/1971 | Girard | 156/66 |
| 3,594,863 | 7/1971 | Erb | 425/327 |
| 3,758,657 | 9/1973 | Menzin et al. | 264/167 |
| 4,461,738 | 7/1984 | Russell | 264/167 |
| 4,794,028 | 12/1988 | Fischer | 264/167 |
| 4,861,399 | 8/1989 | Rajala et al. | 156/66 |
| 4,999,067 | 3/1991 | Erb et al. | 156/66 |
| 5,260,015 | 11/1993 | Kennedy et al. | 264/243 |
| 5,393,475 | 2/1995 | Murasaki et al. | 264/167 |

*Primary Examiner*—Jeffery R. Thurlow
*Attorney, Agent, or Firm*—Hill, Steadman & Simpson

[57] ABSTRACT

Molten resin is extruded in a predetermined width from an extrusion nozzle. The molten resin is forced to a die wheel, which is situated facing the extrusion nozzle with a predetermined gap therewith, has inside a cooling unit and is adapted to be rotated in one direction. On the surface of the die wheel, a flat-plate-like substrate member and engaging members are integrally molded of the molten resin. Simultaneously, as a continuous filament is supplied, loop members are successively formed. Then the loop members are pressed against the substrate member in upright posture and are successively fused therewith.

14 Claims, 3 Drawing Sheets

FIG.1